US009296330B2

(12) United States Patent
Diamond (10) Patent No.: US 9,296,330 B2
(45) Date of Patent: Mar. 29, 2016

(54) CARGO RESTRAINT (71) Applicant: Frederick J. Diamond, North Royalton, OH (US)

(72) Inventor: Frederick J. Diamond, North Royalton, OH (US)

(73) Assignee: Midwest Precison Products, Inc., North Royalton, OH (US)

( * ) Notice: Subject to any disclaimer, the term of this patent is extended or adjusted under 35 U.S.C. 154(b) by 151 days.

(21) Appl. No.: 13/850,020

(22) Filed: Mar. 25, 2013

(65) Prior Publication Data

US 2014/0117137 A1 May 1, 2014

Related U.S. Application Data (60) Provisional application No. 61/616,059, filed on Mar. 27, 2012.

(51) Int. Cl.
*B60P 7/08* (2006.01)
(52) U.S. Cl.
CPC ............... *B60P 7/083* (2013.01); *Y10T 24/318* (2015.01); *Y10T 24/45225* (2015.01)

(58) Field of Classification Search
USPC .................. 254/213, 216–218, 222, 223, 256
See application file for complete search history.

(56) References Cited

U.S. PATENT DOCUMENTS

| 5,282,706 | A | 2/1994 | Anthony et al. | |
|---|---|---|---|---|
| 6,547,333 | B2 * | 4/2003 | Parenteau et al. | 297/397 |
| 7,789,603 | B2 | 9/2010 | Huck | |
| 7,909,553 | B2 * | 3/2011 | Snyder | 410/100 |
| 2012/0019043 | A1 * | 1/2012 | Merrill et al. | 297/484 |

\* cited by examiner

*Primary Examiner* — Emmanuel M Marcelo
*Assistant Examiner* — Angela K Caligiuri
(74) *Attorney, Agent, or Firm* — Kane Kessler, P.C.; Paul E. Szabo (57) ABSTRACT

A cargo restraint in the form of a belt retractor with a spool includes a manually engageable lock cam actuator mechanism including a lock cam actuator handle and a cam movable by the lock cam actuator handle between a first position blocking belt withdrawal and a second position allowing belt withdrawal. A return spring always biases the spool for rotation in the belt retraction direction when the lock cam actuator mechanism is in either the first position or the second position. A ratchet mechanism is manually actuatable to selectively rotate the spool in the belt retraction direction to remove elasticity or slack in the belt webbing.

9 Claims, 10 Drawing Sheets

CARGO RESTRAINT

RELATED APPLICATION

This application is a nonprovisional of U.S. Provisional Application No. 61/616,059, filed Mar. 27, 2012, the benefit of the filing date of which is hereby claimed, and the disclosure of which is hereby incorporated by reference.

BACKGROUND OF THE INVENTION

This invention relates to a cargo restraint, for example of the type used to restrain cargo on a pallet, cart, rack, or dolly by securing a retractor to one side of the pallet, cart, rack, or dolly, extending a belt from the retractor across the top of the cargo to the opposite side of the pallet, cart, rack, or dolly, and securing the end of the belt to the opposite side of the pallet, cart, rack, or dolly. One such cargo restraint is shown in U.S. Pat. No. 5,282,706, the disclosure of which is incorporated by reference. That restraint has certain functional drawbacks, as noted below. The restraint of the present invention addresses those issues.

DETAILED DESCRIPTION

Figure 1:
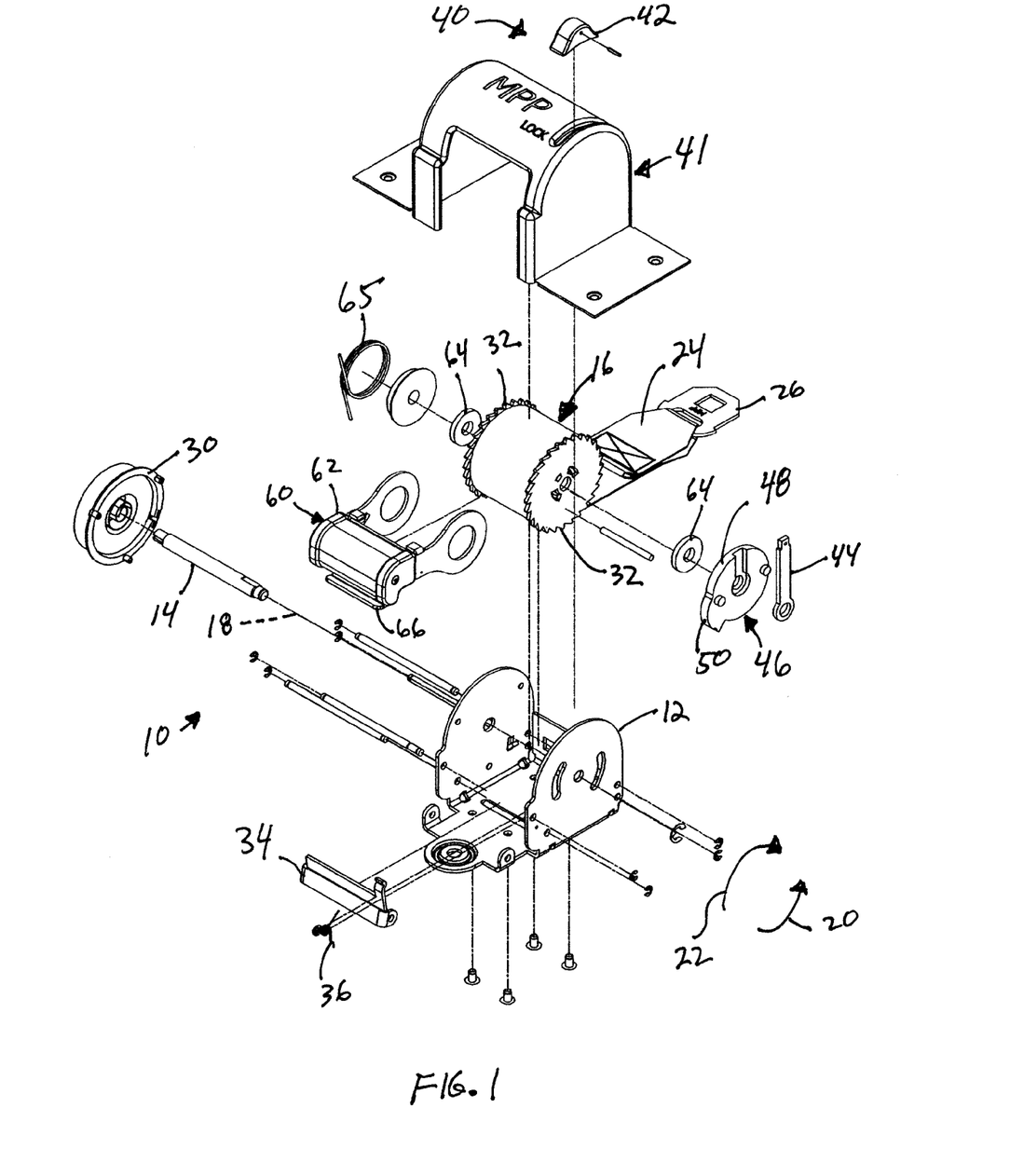
FIG. 1 is an exploded perspective view of the component parts of a cargo restraint that is a first embodiment of the invention.
Figures 2, 3:
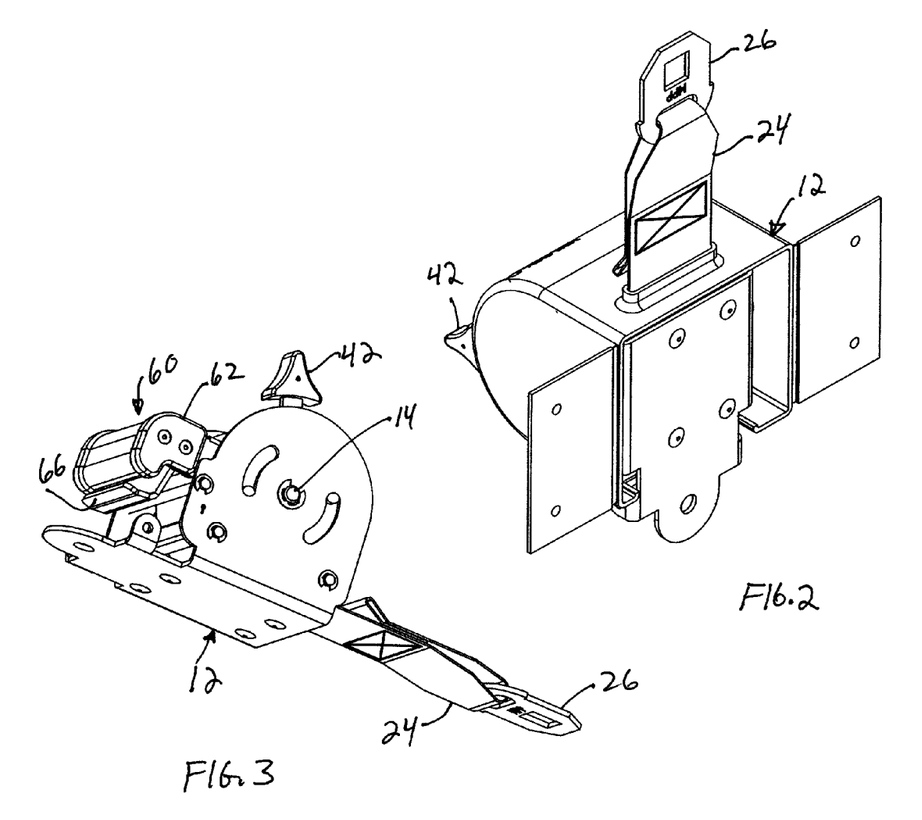
FIG. 2 is a bottom perspective view of the cargo restraint of FIG. 1 with the plastic cover flaps in a detached position.
FIG. 3 is a side perspective view of the cargo restraint of FIG. 1.

This invention relates to a cargo restraint. The invention is applicable to cargo restraints of different constructions. As representative of the invention, FIG. 1 illustrates a cargo restraint 10 that is a first embodiment of the invention.

The cargo restraint 10 includes a base 12 with a shaft 14. The shaft 14 supports a spool 16 for rotation about an axis 18, in a belt withdrawal direction 20 and an opposite belt retraction direction 22. A length of belt webbing 24 with a tongue 26 at its terminal end is wound on the spool 16. A return spring 30 biases the spool 16 for rotation in the belt retraction direction 22. The spool 16 has ratchet teeth 32 on its opposite ends. A lock pawl 34 is biased by a spring 36 toward engagement with the ratchet teeth 32.

The restraint 10 includes a cover 41. The cover 41 may be made from plastic or metal, and may be differently configured than as shown. In FIG. 1 the cover 41 is shown as a plastic cover with the cover flaps opened. The restraint 10 also includes a manual lock cam actuator mechanism 40.

Figure 8:
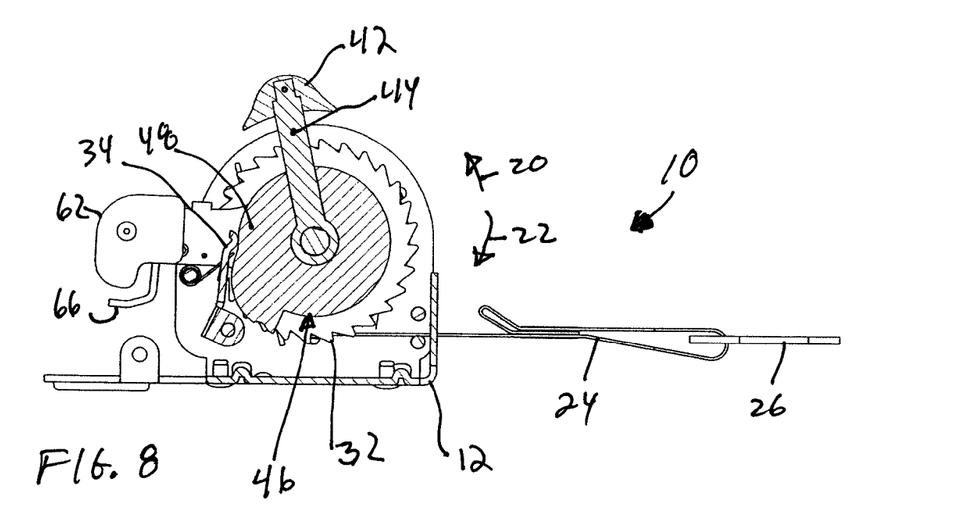
FIG. 8 is a side view of the cargo restraint of FIG. 1, partially in section, also shown in the locked condition.

The manual lock mechanism 40 includes a manually engageable lock actuator tab 42 fixed on a lock cam actuator handle 44. The lock cam actuator handle 44 is fitted into a cam 46 for pivoting movement with the cam about the axis 18. When the lock cam actuator handle 44 is manually pivoted to a locking position as shown in FIG. 8, the cam 46 is placed in a position in which a radially smaller portion 48 of the cam is located under the lock pawl 34. This allows the lock pawl 34 to be pivoted under the influence of the spring 36 into engagement with the ratchet teeth 32. This engagement blocks rotation of the spool 16 in the belt withdrawal direction 20, and blocks unwinding of the belt webbing 24 from the spool 16. The belt webbing 24 can still be tightened, by rotating the spool 16 in the belt retraction direction 22; if this happens, the lock pawl 34 is cammed up and bounces over each successive ratchet tooth 32.

Figure 5:
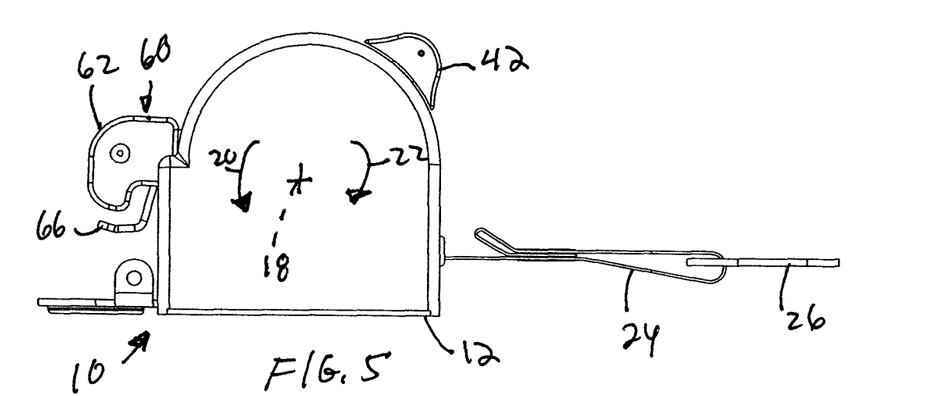
FIG. 5 is a schematic side elevational view of the cargo restraint of FIG. 1, shown in an unlocked condition.
Figure 6:
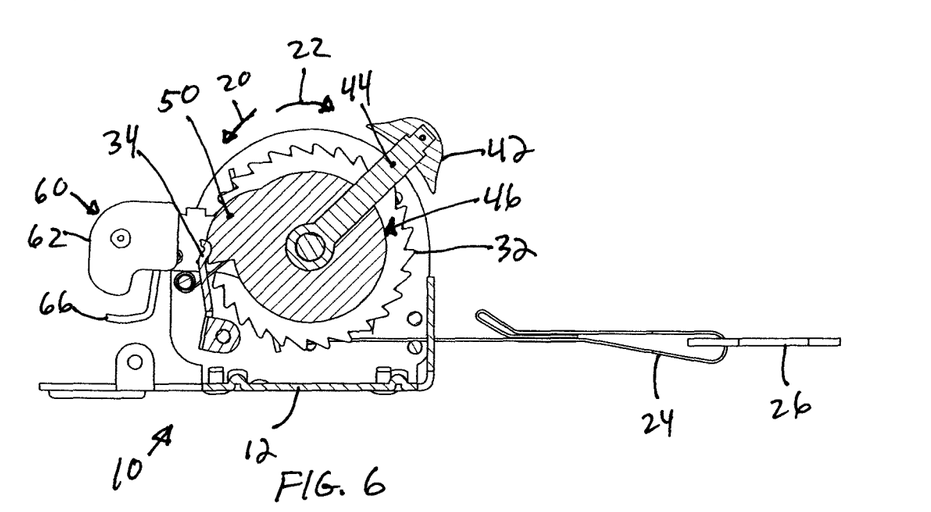
FIG. 6 is a side view of the cargo restraint of FIG. 1, partially in section, also shown in the unlocked condition.

If the tab 42 and the lock cam actuator handle 44 are manually pivoted to a release or unlocked position as shown in FIGS. 5 and 6, a radially larger portion 50 of the cam 46 moves into position under the lock pawl 34 and lifts the pawl off the ratchet teeth 32. The spool 16 is free to rotate in either direction, and belt webbing 24 can be unwound from the spool. The only force acting on the spool 16 is the force of the return spring 30, and so the belt webbing 24 can be withdrawn and retracted with no appreciable friction. The return spring 30 always biases the restraint 10 to retract the belt webbing 24, whether the manual lock mechanism 40 is in the locked or unlocked condition.

Figure 4:
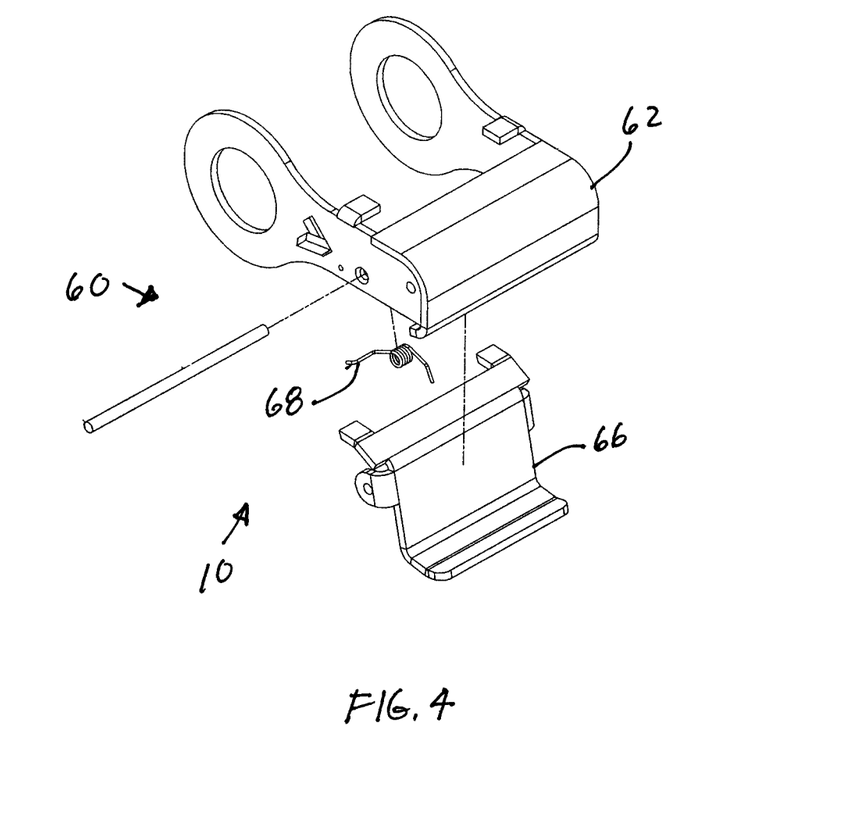
FIG. 4 is a perspective view of the component parts of a trigger assembly that forms part of the cargo restraint of FIG. 1.

The restraint 10 also includes a tightening mechanism or ratchet mechanism 60 (FIGS. 1, 4, and 5). The ratchet mechanism 60 includes a ratchet handle 62 that is supported on pivot disks 64 (FIG. 1) which ride on the shaft 14. The ratchet handle 62 is thus supported on the base 12, for limited pivoting movement about the axis 18, radially outward of the ratchet teeth 32. A handle return spring 65 biases the ratchet handle 62, relative to the spool 16, to the pivotal position shown in FIGS. 5 and 6.

Figure 12:
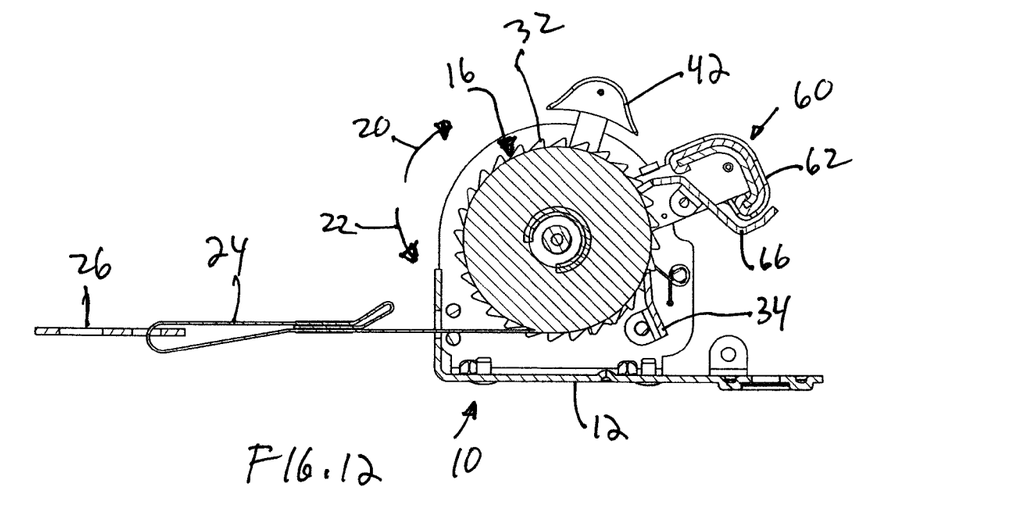
FIG. 12 is a view similar to FIG. 11 taken from the opposite side of the cargo restraint.

The ratchet mechanism 60 also includes a second pawl in the form of a trigger 66 (FIG. 4) that is pivotally mounted on the ratchet handle 62 for movement relative to the ratchet handle between a first position (FIGS. 5 and 6) relatively far away from the ratchet handle, and a second position (FIGS. 9 and 10) relatively close to the ratchet handle. The trigger 66 is biased by a trigger spring 68 (FIG. 4) into the first position. When the trigger 66 is in the first position, it is out of engagement with the ratchet teeth 32. When the trigger 66 is manually moved to and held in the second position, against the bias of the trigger spring 68, it is in engagement with the ratchet teeth 32 (FIGS. 10 and 12)

When it is desired to secure cargo using the restraint 10, the lock actuator tab 42 is manually moved to the unlocked position, as shown in FIGS. 5 and 6. Belt webbing 24 is then unwound from the spool 16 by pulling on the tongue 26, and the tongue 26 is secured to a buckle or other terminal point (not shown) elsewhere on the cargo or cargo support. This operation typically involves unwinding some excess belt webbing 24 from the spool 16. When the tongue 26 is thereafter released, the return spring 30 snugs up the belt webbing 24, removing the slack caused by the withdrawal of excess belt webbing.

Figure 7:
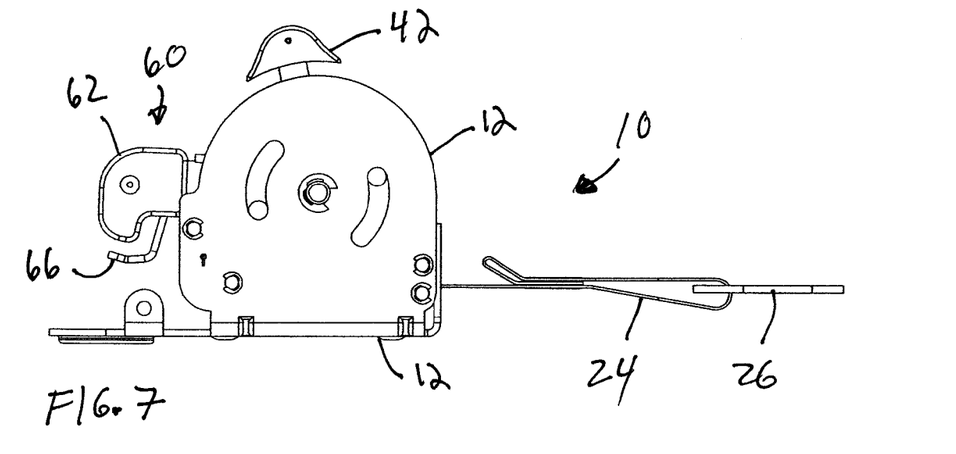
FIG. 7 is a schematic side elevational view of the cargo restraint of FIG. 1, shown in a locked condition.

The lock actuator tab 42 is then moved to the locked position shown in FIGS. 7 and 8. This movement causes the cam 46 to rotate to a position as shown in FIG. 8 in which the lock pawl 34 is biased into engagement with the ratchet wheels 32. The engagement of the lock pawl 34 with the ratchet teeth 32 blocks rotation of the spool 16 in the belt withdrawal direction 20, thereby blocking unwinding of the belt webbing 24 from the spool 16. The belt webbing 24 is biased by return spring 30 to be retracted, but not extended; the cargo is secured.

It may then be desired to further tighten the belt webbing 24 about the cargo, to account for any elasticity in the webbing, or to add additional tension to the webbing. The ratchet mechanism 60 is used to accomplish this.

Figure 9:
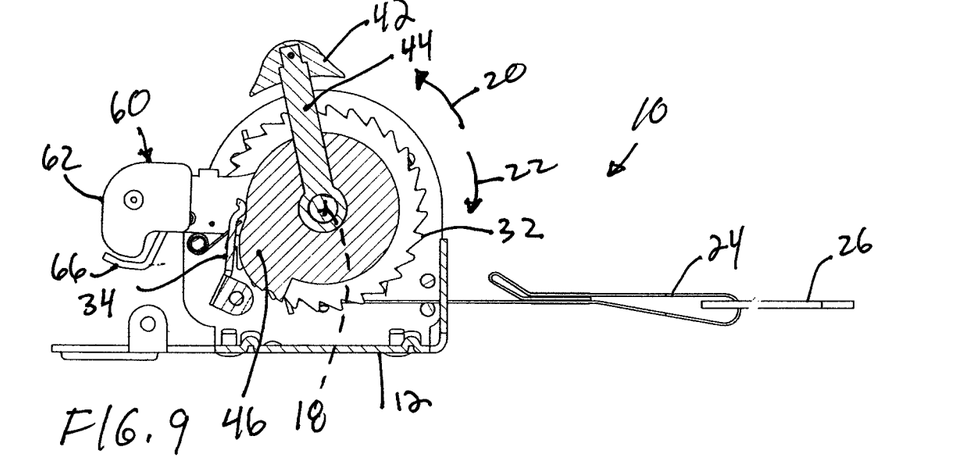
FIG. 9 is a schematic side view of the cargo restraint of FIG. 1, partially in section, shown in the locked condition and with the trigger assembly actuated.
Figure 10:
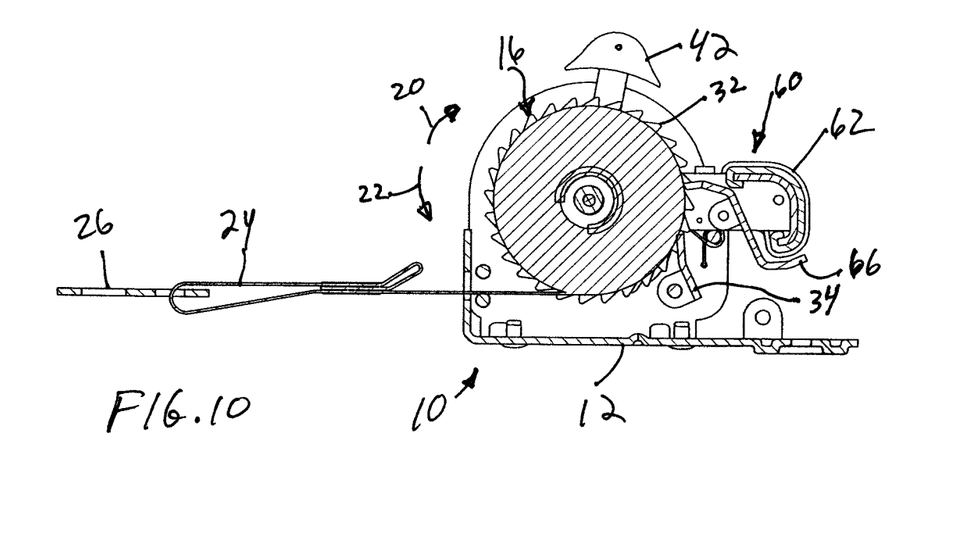
FIG. 10 is a view similar to FIG. 9 taken from the opposite side of the cargo restraint.
Figure 11:
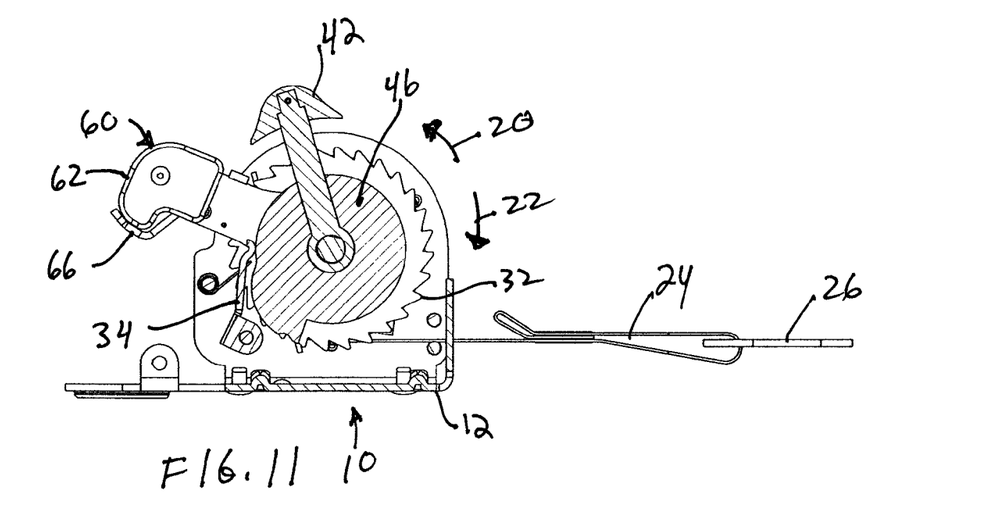
FIG. 11 is a schematic side view of the cargo restraint of FIG. 1, partially in section, shown in the locked condition and with the trigger assembly actuated and thereafter pivoted to a tightening position.

Specifically, the trigger 66 and the ratchet handle 62 are squeezed together as shown in FIGS. 9 and 10, with the trigger moving closer to the handle against the biasing force of the trigger spring 68. This action moves the trigger 66 into engagement with the ratchet teeth 32, as shown in FIG. 12. When the ratchet handle 62 is then pivoted about the spool 16 in the belt retraction direction 22 (upward as viewed in FIGS. 11 and 12), the ratchet handle 62 pulls the trigger 66 with it, and the engagement of the trigger with the ratchet teeth 32 causes the spool to rotate in the belt retraction direction. This rotation of the spool 16 tightens the belt webbing 24, to remove any slack and elasticity of the webbing. The cargo is even more tightly secured. During this tightening movement (rotation) of the spool 16, the ratchet teeth 32, as they rotate sequentially under the lock pawl 34, cause the lock pawl to be cammed up and bounce over the moving ratchet teeth.

Figure 13:
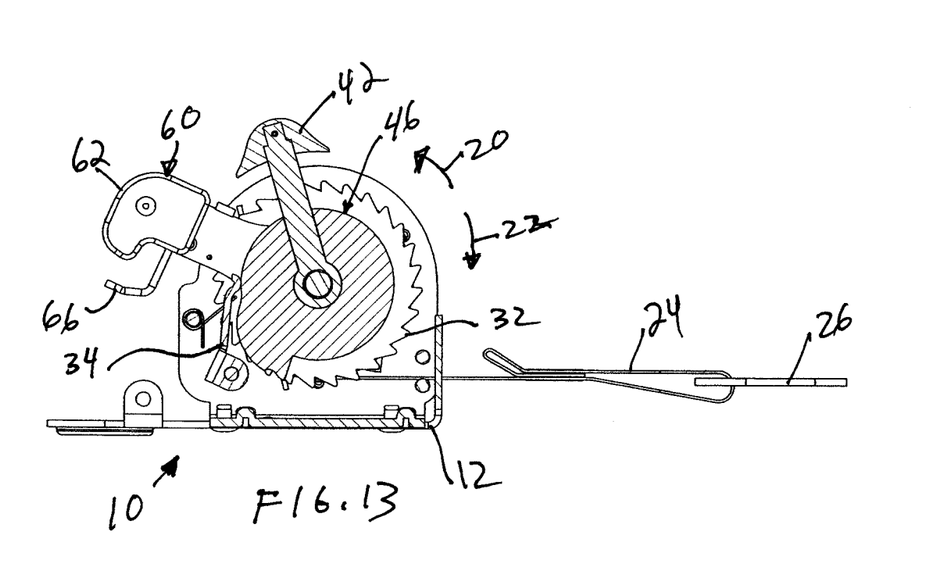
FIG. 13 is a schematic side view of the cargo restraint of FIG. 1, partially in section, shown in the locked condition and with the trigger assembly having first pivoted to a tightening position and thereafter released.
Figure 14:
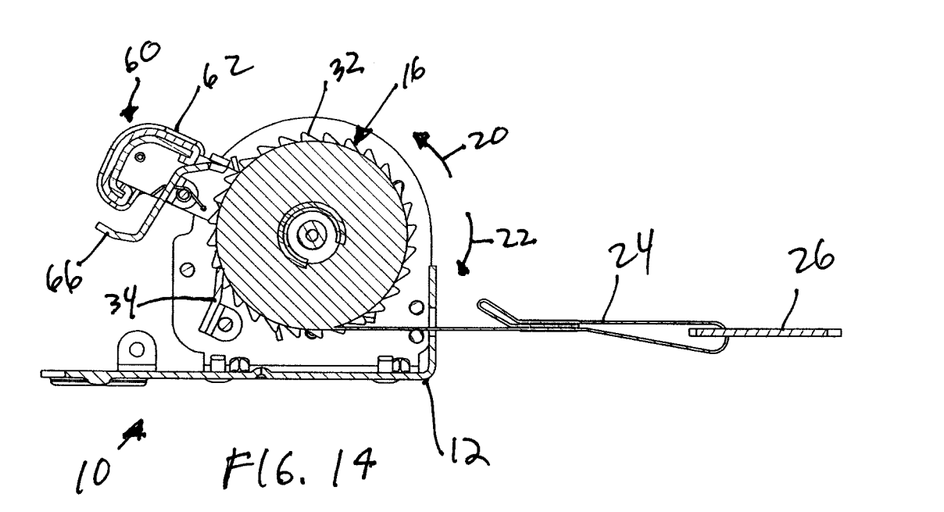
FIG. 14 is a view similar to FIG. 13 taken at a different sectional location of the cargo restraint.

When the ratchet handle 62 and trigger 66 are thereafter released (FIGS. 13 and 14), the ratchet handle return spring 65 causes the ratchet handle to pivot back to its starting position shown in FIGS. 5 and 6. At the same time, the trigger 66, under the influence of the trigger spring 68, returns to its first position, away from the ratchet handle 62 and out of engagement with the ratchet teeth 32.

During all this actuation of the ratchet mechanism 60, the return spring 30 always biases the restraint 10 to retract the belt webbing 24, whether the ratchet mechanism is engaged or not. This minimizes the possibility of slack arising in the belt webbing 24.

Figure 15:
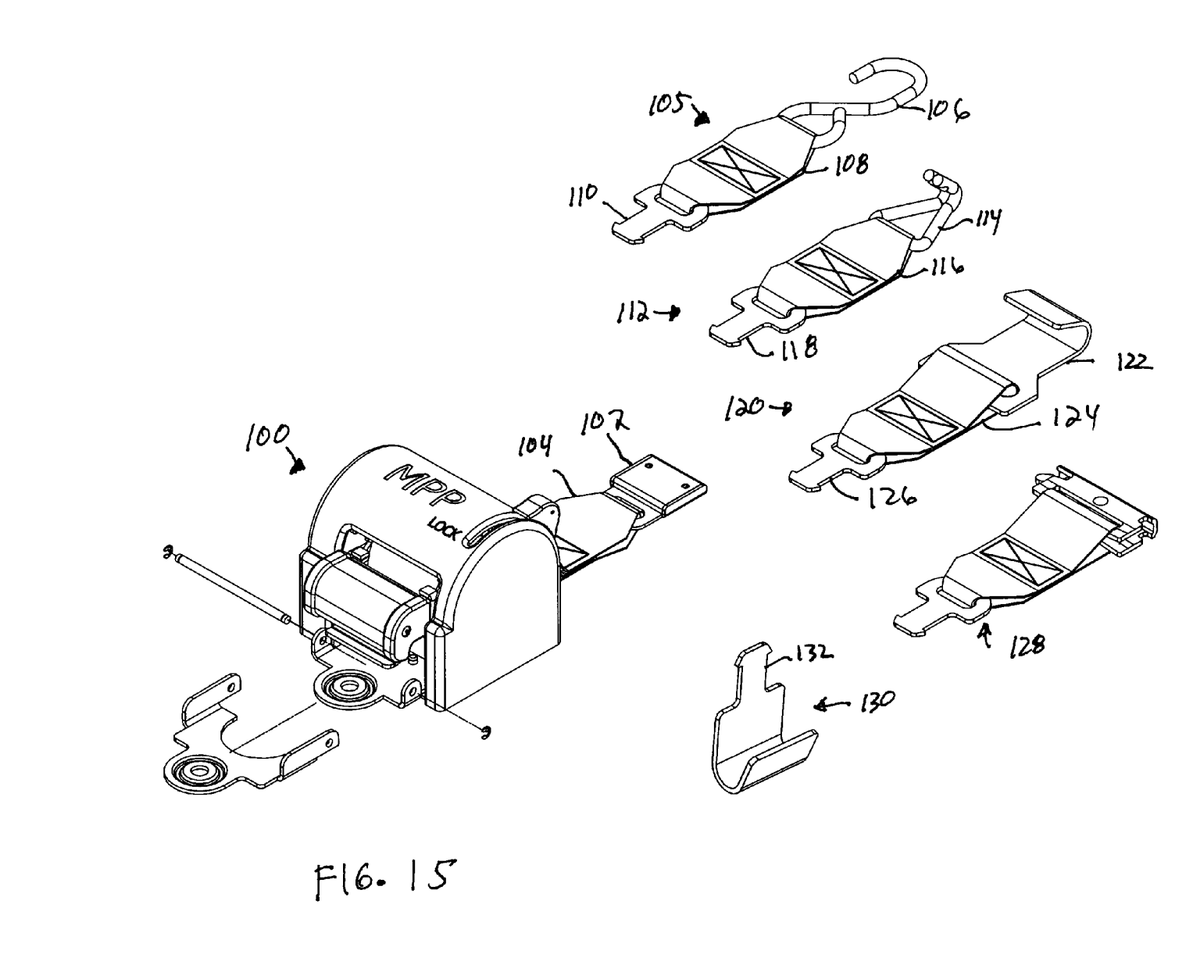
FIG. 15 illustrates the use of a number of different terminal end connectors on a retractable cargo restraint of the present invention.

In accordance with another feature of the present invention, a cargo restraint includes a plurality of different terminal end connectors that are usable on the belt, rather than simply the tongue 26 shown in FIGS. 1-14. This feature of the invention is illustrated in FIG. 15 with respect to a cargo restraint 100.

The cargo restraint 100 may be similar in structure and operation to the cargo restraint 10 (FIGS. 1-14). Instead of the tongue 26, however, the cargo restraint 100 includes a buckle 102 on the end of retractable belt webbing 104. The buckle 102 is adapted to lockingly receive any one of a number of different terminal end connectors.

One such terminal end connector is an S-hook connector 105 that includes an S-hook 106 on one end of a short length of belt webbing 108, with a tongue 110 on the other end of the length of webbing. The tongue 110 is engageable with the buckle 102 to provide an S-hook on the end of the retractable belt 104.

Another terminal end connector is a Double J hook connector 112 that includes a Double J hook 114 on one end of a short length of belt webbing 116, with a tongue 118 on the other end of the length of webbing. The tongue 118 is engageable with the buckle 102 to provide a Double J hook on the end of the retractable belt 104.

Another terminal end connector is a flat hook connector 120 that includes a flat hook 122 on one end of a short length of belt webbing 124, with a tongue 126 on the other end of the length of webbing. The tongue 126 is engageable with the buckle 102 to provide a flat hook on the end of the retractable belt 104. Still another terminal end connector, E-track connector, is shown at 128.

Another type of terminal end connector that can be used with a cargo restraint of the present invention is a simple flat hook 130 as shown in FIG. 15. This hook 130 has a tongue end portion 132 that engages directly into the buckle 102 on the end of the extendable belt webbing 104, eliminating the need for the intermediate length of belt webbing. One or more of the other terminal end connectors shown in the Figures can be implemented in this manner, also.

As a result, because the buckle 102 can accept the tongues of any of the terminal end connectors, the extended belt webbing of the cargo restraint 100 can be secured to several different devices or structures. The different terminal end connectors can be provided as a kit, sold with or separately from the restraint. Of course, terminal end connectors other than those particular ones that are illustrated, can be provided, to enable connection of the extended belt webbing with other types of structures or devices.

Figure 16:
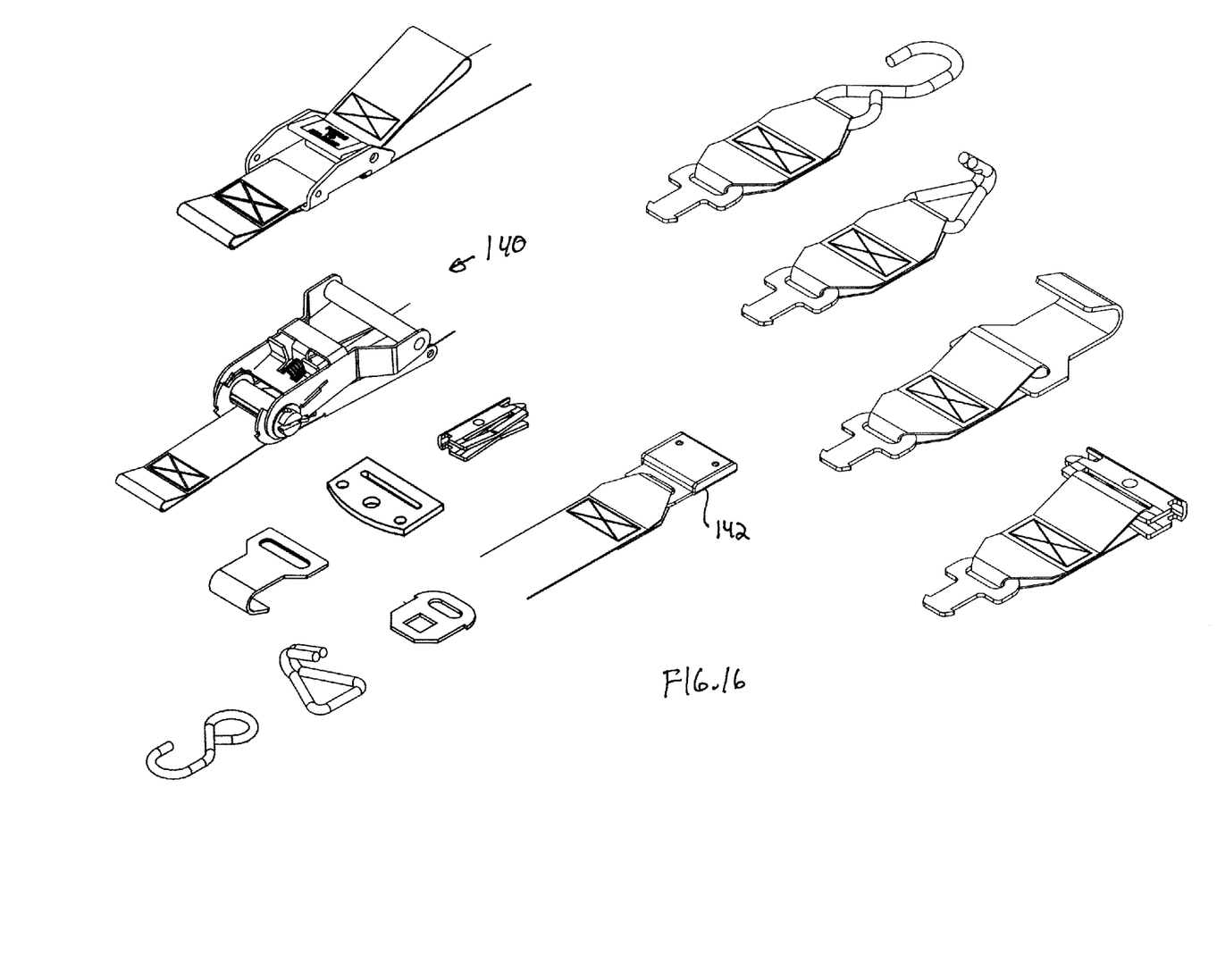
FIG. 16 illustrates the use of a number of different terminal end connectors on a fixed length cargo restraint of the present invention.

In a still further alternative embodiment of the invention, the plurality of different terminal end connectors can be provided on a fixed length belt. This feature is illustrated in FIG. 16 which shows a belt assembly 140 having a buckle 142 on its end that is engageable with any one of a plurality of terminal end connectors, as illustrated.

The cargo restraint 10 of the present invention has several advantages compared to the cargo restraint of U.S. Pat. No. 5,282,706. Specifically, in the restraint shown in the '706 patent, the lock pawl always rides on the ratchet teeth. This has several detrimental effects.

First, whenever the belt webbing of the '706 patent is being paid out, the lock pawl is bouncing off the ratchet teeth, making noise and resisting pullout. In contrast, when the cargo restraint 10 of the present invention is in the unlocked position to enable belt withdrawal, the lock pawl 34 is positively held off the ratchet teeth 32 by the radially larger cam portion 50. This eliminates the noise of the pawl 34 bouncing off the ratchet teeth 32, and enables the belt webbing 24 to be withdrawn and retracted with no appreciable friction.

Second, when the belt webbing of the restraint shown in the '706 patent is pulled out and engaged at its far end to restrain cargo, and the handle or depression plates are moved and then released, the lock pawl engages in the next ratchet tooth and blocks belt retraction. Thus, slack is present in the extended belt webbing, which is, of course, undesirable. This slack can only be removed by manually actuating and using the tightening mechanism of the '706 patent.

In contrast, in the cargo restraint 10 of the present invention, the return spring 30 always biases the spool 16 to rotate in the belt retraction direction 22, and always tensions the belt webbing 24. Thus, if there is any slack present when the belt webbing 24 is pulled out and engaged at its far end to restrain cargo and is then released, that slack is immediately taken up by the action of the return spring 30. The ratchet mechanism 60 does not have to be used for that purpose. Rather, the ratchet mechanism 60 can thereafter be used, if desired, to account for any elasticity in the belt webbing 24, or to add additional tension to the webbing that is securing the cargo.

From the above description of the invention, those skilled in the art will perceive improvements, changes and modifications in the invention. Such improvements, changes and modifications within the skill of the art are intended to be covered by the appended claims.

The invention claimed is:

1. A cargo restraint comprising:
   a base;
   a spool supported on the base for rotation relative to the base about an axis in a belt retraction direction and an opposite belt withdrawal direction;
   a return spring biasing the spool for rotation in the belt retraction direction;
   a length of belt webbing wound on the spool and extensible from the retractor for helping to restrain cargo;
   a ratchet wheel fixed for rotation with the spool;
   a lock pawl that is selectively movable from a first position out of engagement with the ratchet wheel into a second position in engagement with the ratchet wheel to block rotation of the ratchet wheel and the spool in the belt withdrawal direction;
   a manually engageable lock cam actuator mechanism including a lock cam actuator handle and a cam movable by the lock cam actuator handle between a first position holding the lock pawl in engagement with the ratchet wheel and a second position in which the lock pawl is held out of engagement with the ratchet wheel;
   the return spring biasing the spool for rotation in the belt retraction direction and thus tensioning the belt webbing when the lock cam actuator mechanism is in the first position and when the lock cam actuator mechanism is in the second position; and
   a manually actuatable ratchet mechanism separate from the lock cam actuator mechanism for selectively rotating the spool in the belt retraction direction with a manual force supplemental to the biasing force of the return spring to remove elasticity or slack in the belt webbing.

2. The cargo restraint as set forth in claim 1 wherein the ratchet mechanism includes a manually engageable ratchet handle rotatable about the axis and a second pawl connected for movement with the handle about the axis, the second pawl being selectively movable relative to the ratchet handle from a disengaged position in which the second pawl is spaced apart from the ratchet wheel to an engaged position in which the second pawl is in engagement with ratchet wheel thereby to transmit rotational force from the ratchet handle to the ratchet wheel to rotate the ratchet wheel in the belt retraction direction.

3. A cargo restraint as set forth in claim 2 wherein the ratchet mechanism includes a second spring acting between the handle and the second pawl for biasing the second pawl into the disengaged position.

4. The cargo restraint as set forth in claim 1 wherein the belt webbing has a buckle on its terminal end and further including a flat hook terminal end connector having a tongue portion that is engageable with the buckle of the belt webbing to secure the flat hook terminal end connector to the belt webbing.

5. The cargo restraint as set forth in claim 1 wherein:
   the cam is connected in a force-transmitting relationship with the lock pawl, the cam being rotatable between the first position and the second position; and
   the lock cam actuator handle is connected with the cam for rotating the cam between the first position and the second position.

6. The cargo restraint as set forth in claim 1 wherein the belt webbing has a buckle on its terminal end and further including a plurality of different terminal end connectors, each end connector having a tongue that is engageable with the buckle of the belt webbing to secure the terminal end connector to the belt webbing.

7. A cargo restraint as set forth in claim 6 wherein the plurality of different terminal end connectors includes a flat hook connector and an S-hook connector and a double J hook connector and an E-track connector.

8. A cargo restraint in the form of a belt retractor with a spool having belt webbing wound thereon, the cargo restraint including:
   a manually engageable lock cam actuator mechanism including a lock cam actuator handle and a cam movable by the lock cam actuator handle between a first position blocking belt withdrawal and a second position allowing belt withdrawal;
   a return spring that always biases the spool for rotation in the belt retraction direction when the lock cam actuator mechanism is in either the first position or the second position; and
   a manually actuatable ratchet mechanism separate from the lock cam actuator mechanism for selectively rotating the spool in the belt retraction direction with a manual force supplemental to the biasing force of the return spring to remove elasticity or slack in the belt webbing.

9. A cargo restraint as set forth in claim 8 further including a lock pawl engageable with ratchet teeth on the spool for blocking rotation of the spool in the belt withdrawal direction, and wherein the cam holds the lock pawl off the ratchet teeth when the retractor is unlocked.

* * * * *